July 28, 1959      S. E. THOMAS      2,897,414
FREEZE TYPE SOLENOID
Filed April 15, 1955
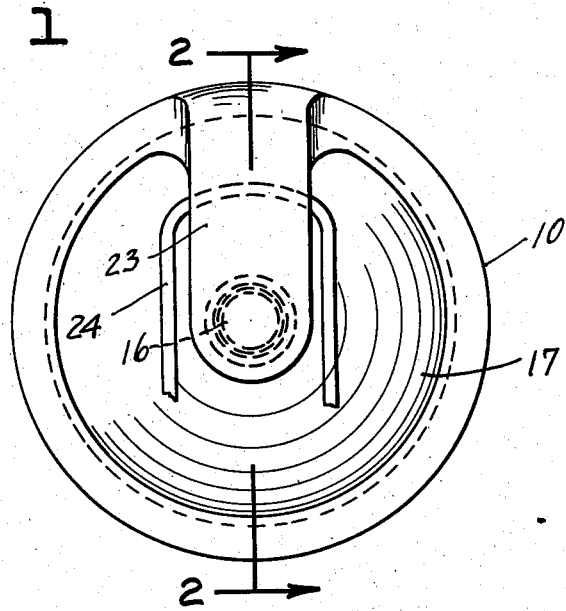
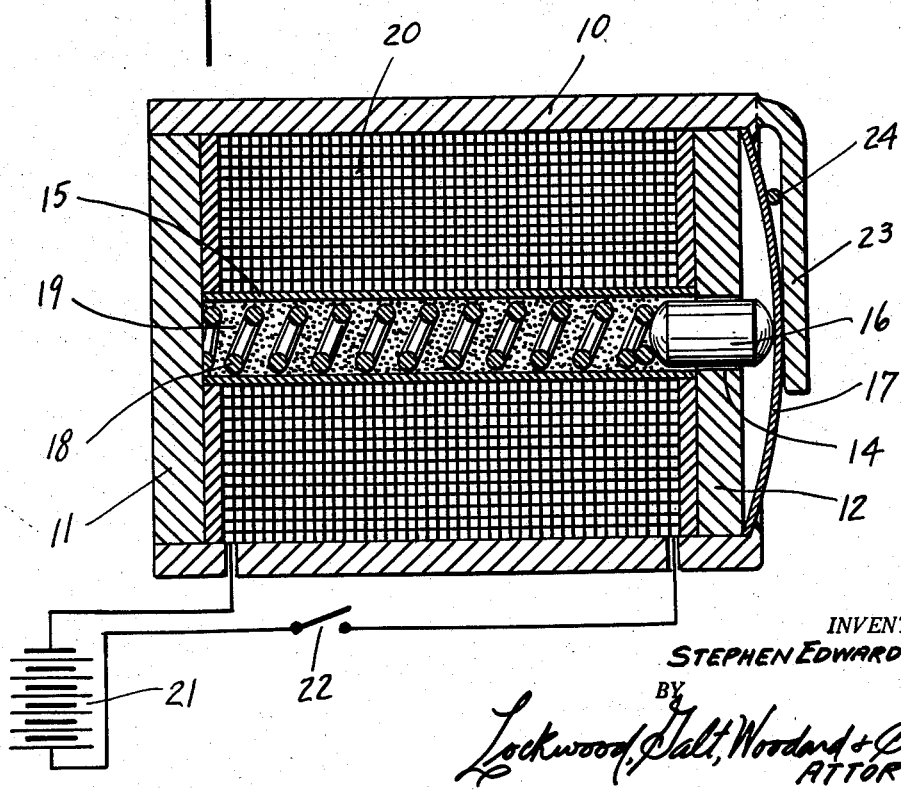
INVENTOR.
STEPHEN EDWARD THOMAS
BY Lockwood, Galt, Woodard & Smith
ATTORNEYS.

United States Patent Office 2,897,414
Patented July 28, 1959

2,897,414

FREEZE TYPE SOLENOID

Stephen Edward Thomas, Fort Wayne, Ind., assignor to The Magnavox Company, Fort Wayne, Ind., a corporation Application April 15, 1955, Serial No. 501,639

5 Claims. (Cl. 317—159)

This invention relates generally to solenoids, and more particularly to a solenoid adapted to lock a holding element.

Conventional solenoids are utilized for such purposes as arming bombs or rockets wherein the solenoid may be actuated to move a slug into and out of a position for intercepting an arming loop or other mechanism so that a bomb or rocket may be discharged in either armed or unarmed condition. It is also necessary to provide additional mechanical elements for normally holding the arming member in a releasable position. Also, various spring elements are required for retaining the respective mechanisms in certain predetermined positions while permitting movement thereof for accomplishing the various required functions.

The principal object of this invention is to simplify solenoid structures, making it possible to eliminate parts and retain conventional functions.

Another object of this invention is to provide a solenoid having an actuating member which may be locked in a desired position, and which does not require the conventional type of retaining latches and restoring mechanisms.

In accordance with this invention there is provided a solenoid having a cylindrical member, a winding surrounding said member, a work performing member, spring means within said cylindrical member normally controlling movement of said work performing member, and finely divided magnetic material within said cylindrical member surrounding the coils of said spring and responsive to the magnetic field current generated by said winding for locking said spring member and said work performing member in any desired position.

The full nature of the invention will be understood from the accompanying drawings and the following description and claims:

Fig. 1 is an end elevation of the solenoid provided in accordance with this invention.

Fig. 2 is a cross section taken on line 2—2 of Fig. 1.

Referring to the drawings, there is provided a cylindrical casing 10 of magnetic material closed at one end by a disc 11 of magnetic material and at the other end by a disc 12 of magnetic material. Disc 12 includes a centrally disposed aperture 14 and coaxially therewith is a cylindrical member 15 extending between the discs 11 and 12.

There is normally positioned within the aperture 14 a work performing member 16 which may be of non-magnetic material, and which may bear at one end on the central portion of a flexible diaphragm 17. Diaphragm 17 is illustrated by way of example only, and it will readily be understood that a bellows or any other movable mechanical element may be substituted therefor.

The other end of work performing member 16 is engaged by a coil spring 18 compressed against the central portion of disc 11. The space between the coils of spring 18 may be filled with iron filings or iron dust 19, or particles of other magnetic materials. Surrounding the cylindrical member 15 is a conventional solenoid winding 20 which may be connected to a conventional energizing circuit including a source of potential 21 and a switch 22.

In operation, the work performing member 16 may be held in a neutral position by spring 18 and the flexible diaphragm or bellows 17. In response to actuation of the diaphragm or bellows 17, the member 16 may be moved inwardly and outwardly of cylindrical member 15, compressing spring 18 or permitting it to expand. The iron particles or dust 19 normally do not have any material effect on the action of spring 18 and, thus, members 16 and 17 may be movable.

Therefore, to lock the spring 18 and therewith the work performing member 16 and the diaphragm 17, in the desired fixed position, switch 22 may be closed energizing winding 20, thereby to create a flow of flux through the iron dust 19. In accordance with well known theory, the viscosity of the iron dust immediately changes to the point where the dust has the characteristics of a solid metallic unit, thereby freezing the spring 18 in a locked position. This has the effect of also locking the positions of members 16 and 17.

A useful application of this invention, described by way of example, may include a retaining wall 23 either attached to casing 10 or forming a part of an aircraft structure, for example, and providing support for casing 10. A loop 24 of a bomb arming wire may be normally trapped in the position shown so that the solenoid winding 20 may be energized to freeze the magnetic material 19, locking work performing member 16 in the position shown where diaphragm 17 is held in contact with retaining wall 23. If a bomb is dropped, arming loop 24 can not pass between the wall 23 and diaphragm 17, thereby pulling free of the bomb and arming it.

If it is desired to drop the bomb without arming it, winding 20 in its normally de-energized condition will not lock the magnetic material 19, thereby leaving spring 18 free to flex and to permit member 16 and diaphragm 17 to move inwardly. When a bomb is dropped under these conditions, the arming loop 24 passes downwardly between diaphragm 17 and wall 23 and does not pull free of the bomb, whereby the bomb is unarmed.

From the foregoing description it will be apparent that solenoid structures are materially simplified by the application of this invention. Assembly and production procedures are simplified and costs materially reduced. Furthermore, reduction of moving parts provides improved reliability of operation.

The invention claimed is:

1. A solenoid comprising a cylindrical magnetic structure closed at one end by a first disc and at the other end by a second disc having a centrally disposed aperture, a cylindrical member extending between said first and second discs concentrically of said aperture, a winding mounted on said cylindrical member, a work performing member normally positioned within said aperture, a coil spring extending between said work performing member and said first disc, and magnetic particles filling said cylindrical member and surrounding the coils of said spring, whereby said particles may be free to move when said winding is de-energized to permit movement of said spring and may be frozen in fixed position with respect to one another in response to energization of said winding to prevent movement of said spring.

2. A solenoid comprising a magnetic casing closed at one end by a first member and at the other end by a second member having a centrally disposed aperture, a hollow core extending between said first and second members concentrically of said aperture, a winding mounted on said core, a work performing member normally positioned within said aperture, a coil spring extending between said work performing member and said first member, and magnetic particles filling said core and surrounding the coils of said spring, whereby said particles may be free to move when said winding is de-energized to permit movement of said spring and may be frozen in fixed position with respect to one another in response to energization of said winding.

3. A solenoid comprising a core member, a winding mounted on said core member, a work performing member normally positioned within one end of said core, a coil spring extending between said work performing member and the other end of said core member, and magnetic particles filling said core member and surrounding the coils of said spring, whereby said particles may be free to move when said winding is de-energized to permit movement of said spring and may be frozen in fixed position with respect to one another in response to energization of said winding.

4. A solenoid comprising a winding, a work performing member normally positioned within one end of said winding, a resilient movable means extending between said work performing member and the other end of said winding, and magnetically responsive means movably and intimately contacting the surface of said resilient means and affected by a magnetic field to lock said resilient means, regardless of the position of said work performing member.

5. A solenoid comprising a winding for generating a magnetic field, a resilient movable means disposed within said winding, and magnetically responsive means comprising magnetic particles movably and intimately contacting the surface of said resilient means and effected by the magnetic field of said winding to lock said resilient means regardless of the position of said resilient means.

References Cited in the file of this patent

UNITED STATES PATENTS

| | | |
|---|---|---|
| 2,115,804 | Fondiller | May 3, 1938 |
| 2,638,496 | Church | May 12, 1953 |
| 2,667,237 | Rabinow | Jan. 26, 1954 |
| 2,687,500 | Jones | Aug. 24, 1954 |

FOREIGN PATENTS

| | | |
|---|---|---|
| 877,345 | Germany | May 21, 1953 |